US012552590B2

(12) United States Patent
Darst et al.

(10) Patent No.: US 12,552,590 B2
(45) Date of Patent: Feb. 17, 2026

(54) PILL CONTAINER ASSEMBLY WITH OUTER SLEEVE

(71) Applicant: Apothecary Products, LLC, Burnsville, MN (US)

(72) Inventors: Daniel Darst, Zimmerman, MN (US); Julia Olson Augdahl, Prior Lake, MN (US)

(73) Assignee: Apothecary Products, LLC, Burnsville, MN (US)

( * ) Notice: Subject to any disclaimer, the term of this patent is extended or adjusted under 35 U.S.C. 154(b) by 0 days.

(21) Appl. No.: 18/647,818

(22) Filed: Apr. 26, 2024

(65) Prior Publication Data

US 2025/0333228 A1 Oct. 30, 2025

(51) Int. Cl.

| | |
|---|---|
| ***A61J 1/03*** | (2023.01) |
| ***A61J 7/00*** | (2006.01) |
| ***B65D 25/04*** | (2006.01) |
| ***B65D 43/16*** | (2006.01) |
| ***B65D 43/22*** | (2006.01) |
| ***B65D 77/04*** | (2006.01) |

(52) U.S. Cl.

CPC ............ *B65D 77/0486* (2013.01); *A61J 1/03* (2013.01); *A61J 7/0084* (2013.01); *B65D 25/04* (2013.01); *B65D 43/162* (2013.01); *B65D 43/22* (2013.01)

(58) Field of Classification Search

CPC .. B65D 59/04; B65D 85/1054; B65D 5/6688; B65D 11/12; B65D 2583/0468; B65D 7/10; B65D 43/12; B65D 77/0486; B65D 77/048; B65D 77/046; B65D 77/0433; B65D 77/0406; A61J 1/03

USPC ... 206/534.2, 538, 539, 529, 534.1, 533, 1.5

See application file for complete search history.

(56) References Cited

U.S. PATENT DOCUMENTS

| | | | | |
|---|---|---|---|---|
| 4,793,492 | A * | 12/1988 | Halbich ................ | A61J 7/0084 206/538 |
| 8,333,281 | B2 | 12/2012 | Saltsov | |
| D824,253 | S | 7/2018 | Mayer | |
| D860,636 | S | 9/2019 | Moody et al. | |
| D919,283 | S | 5/2021 | Guo et al. | |
| 11,166,873 | B1 * | 11/2021 | Lee ........................... | A61J 1/03 |
| D948,865 | S | 4/2022 | Tarafder | |
| D965,285 | S | 10/2022 | Chen | |
| D966,695 | S | 10/2022 | Chen | |
| D966,698 | S | 10/2022 | Chen | |
| D977,821 | S | 2/2023 | Chen | |
| D1,006,432 | S | 12/2023 | Chen | |
| D1,011,726 | S | 1/2024 | Du | |
| 2011/0231006 | A1 * | 9/2011 | Saltsov ................. | A61J 7/0084 221/92 |
| 2014/0251863 | A1 * | 9/2014 | Priebe ....................... | A61J 1/03 206/534 |
| 2016/0075504 | A1 * | 3/2016 | Hart ....................... | B65D 11/12 53/485 |

(Continued)

*Primary Examiner* — Robert Poon

(74) *Attorney, Agent, or Firm* — Merchant & Gould P.C.

(57) ABSTRACT

The present disclosure relates to a container assembly including a multi-chamber container that fits within a protective outer sleeve. The container includes covers for allowing the chambers to be individually accessed. The container includes an integrated retention arrangement that allows the container to be secured within the outer sleeve in a manner in which unintended longitudinal movement between the outer sleeve and the container is prevented.

20 Claims, 23 Drawing Sheets

(56) References Cited

U.S. PATENT DOCUMENTS

| | | | | |
|---|---|---|---|---|
| 2019/0224077 | A1* | 7/2019 | Stein | G08B 21/24 |
| 2020/0115102 | A1* | 4/2020 | Hawry | A61J 1/03 |
| 2022/0175618 | A1 | 6/2022 | Wang | |

* cited by examiner

PILL CONTAINER ASSEMBLY WITH OUTER SLEEVE

TECHNICAL FIELD

This disclosure relates generally to containers for holding and organizing small items. More particularly, this disclosure relates to pill containers.

BACKGROUND

Pill containers for organizing medicine are well known. A common pill container configuration can include separate compartments each corresponding to a separate day of the week. Each compartment can include a separate cover for allowing medicine within each compartment to be separately accessed (e.g., on different days of the week). It is desirable for pill containers to be robust, portable and easy to use.

SUMMARY

In general, this disclosure is directed to containers (e.g., pill containers) that are robust, portable and easy to use.

One aspect of the present disclosure relates to a container assembly including a multi-chamber container that fits within a protective outer sleeve. The container includes covers for allowing the chambers to be individually accessed. The container includes an integrated retention arrangement that allows the container to be secured within the outer sleeve in a manner in which unintended longitudinal movement between the outer sleeve and the container is prevented. By releasing the retention arrangement, relative longitudinal movement is permitted between the container and the outer sleeve for partially or fully removing the container from the outer sleeve.

Another aspect of the present disclosure relates to a container assembly including a container having a first container end and a second container end. The container defines a container length that extends between the first and second container ends. The container also defines storage compartments positioned in a row along the container length between the first and second container ends. The container includes a plurality of covers for covering the storage compartments and for allowing the storage compartments to be individually opened. The container further includes retention tabs respectively carried with the first and second container ends. The retention tabs are each being pivotally moveable relative to their respective first and second container end between a retention position and a release position. The container includes latching arrangements for securing the retention tabs in the retention positions relative to the first and second container ends. The container assembly also includes an outer sleeve configured to slide lengthwise over an exterior of the container. The outer sleeve includes first and second sleeve ends. The outer sleeve is positionable over the container in an installed state in which the first sleeve end is at the first container end and the second sleeve end is at the second container end. The retention tabs are configured such that when the outer sleeve is in the installed state and the retention tabs are secured in the retention positions, retention portions of the retention tabs oppose the first and second sleeve ends to limit axial movement of the container relative to the outer sleeve.

A variety of examples of desirable features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Figure 1:
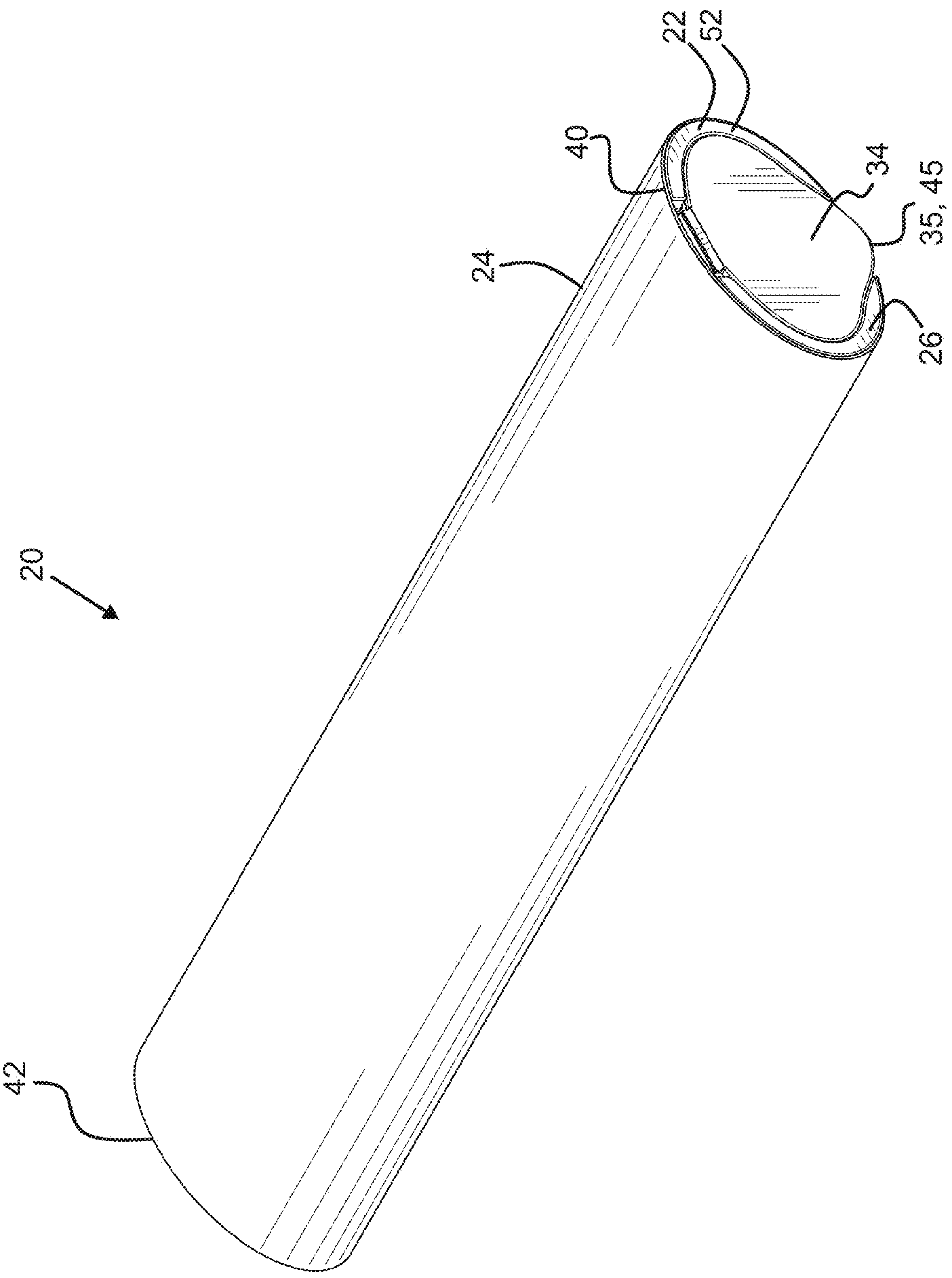
FIG. 1 is a top, end perspective view of a container assembly in accordance with the principles of the present disclosure.
Figure 2:
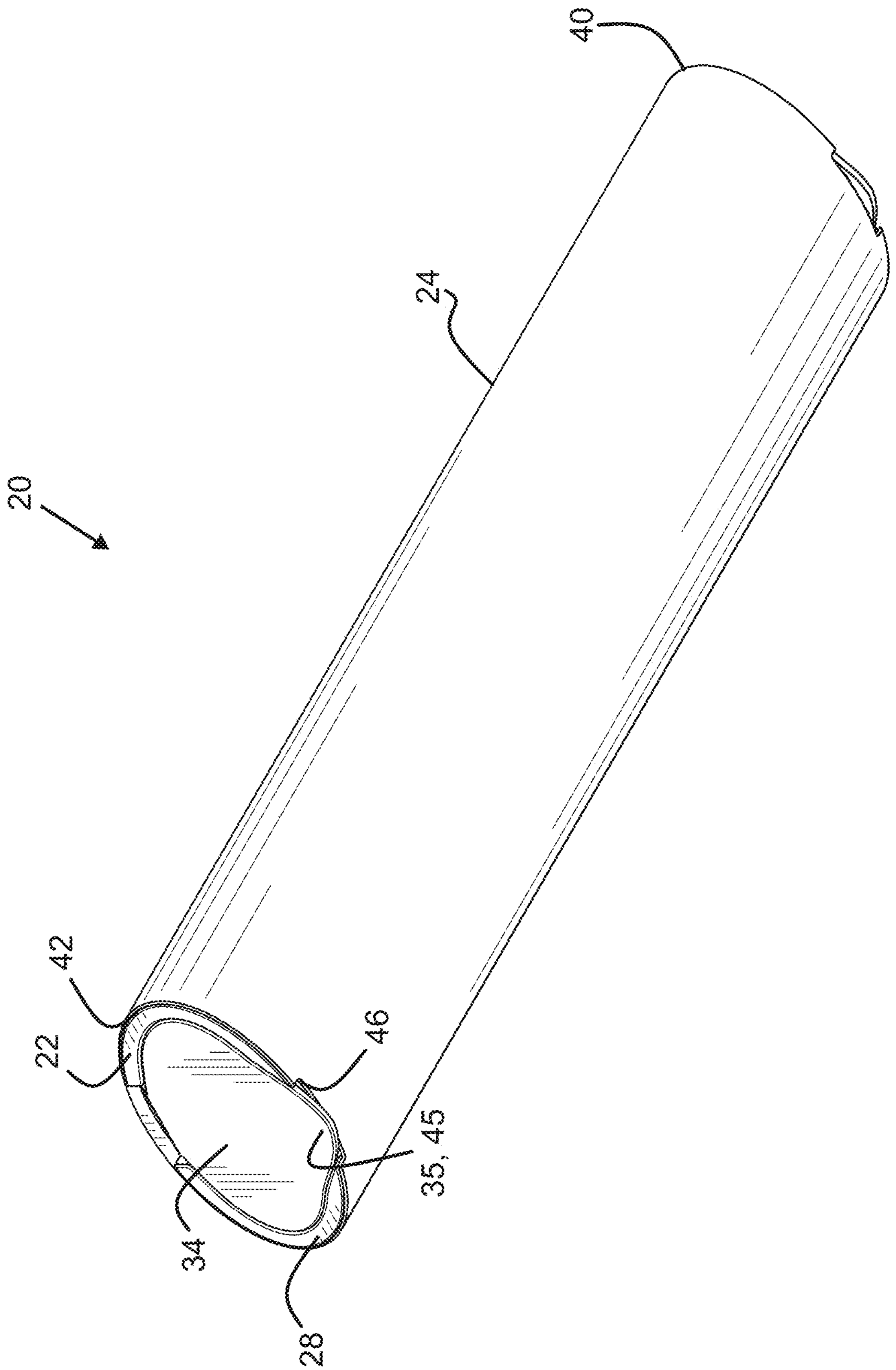
FIG. 2 is a bottom, end perspective view of the container assembly of FIG. 1.
Figure 3:
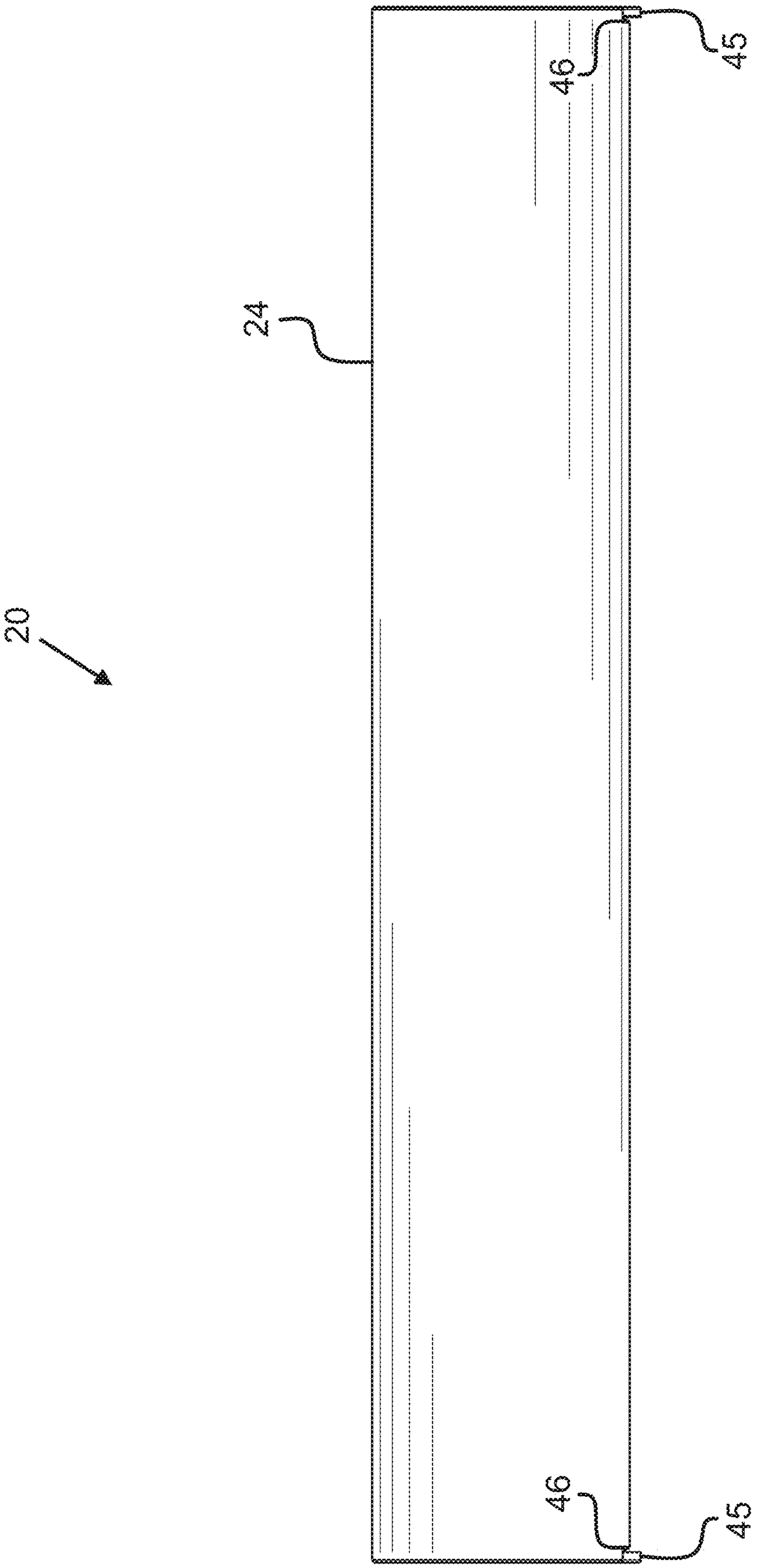
FIG. 3 is a side view of the container assembly of FIG. 1.

Aspects of the present disclosure relate to a container assembly (e.g., a pill container assembly) including a multi-compartment container that slides longitudinally within an outer sleeve. In certain examples, the multi-compartment container can include separate pivotal covers each corresponding to one of the compartments of the container. In certain examples, the container and the outer sleeve both have an oval profile. In certain examples, the outer sleeve can have a metallic construction and the container can have a molded plastic construction. In certain examples, the sleeve can provide protection of the container and can prevent unintended opening of the compartments thereby enhancing the reliability and portability of the container assembly. In certain examples, the container can carry pivotal retention tabs configured to oppose ends of the outer sleeve (e.g., when secured in retention positions) to prevent unintentional axial movement of the container relative to the outer sleeve. In certain examples, one or more of the compartments can be easily accessed by moving one or both of the pivotal retention tabs to release positions, and then axially pushing or pulling the container at least partially from the outer sleeve.

FIGS. 1-7 depict a container assembly 20 in accordance with the principles of the present disclosure. Generally, the container assembly 20 includes a multi-compartment container 22 that can be positioned inside a protective outer sleeve 24. The container 22 is longitudinally moveable (e.g., slidable) relative to the outer sleeve 24 to pull or push the container 22 partially or fully from the outer sleeve 24 to allow for one or more of the compartments to be accessed. The container 22 can include a retaining arrangement that, when in a retaining state, interfaces with the outer sleeve to prevent unintended longitudinal movement of the container 22 relative to the outer sleeve 24. By moving the retaining arrangement to a release state, the container can be manually pushed or pulled from the interior of the outer sleeve 24.

Referring to FIGS. 8-11, the container 22 includes a first container end 26, a second container end 28 and a container length CL that extends between the first and second container ends 26, 28. The container 22 defines storage compartments 30 (see FIGS. 7 and 16) positioned in a row along the container length CL between the first and second container ends 26, 28. The container 22 also includes a plurality of covers 32 for covering the storage compartments 30 and for allowing the storage compartments 30 to be individually opened. The container 22 further includes retention tabs 34 respectively carried with the first and second container ends 26, 28. The retention tabs 34 are each being pivotally moveable relative to their respective first and second container end 26, 28 between a retention position (see FIGS. 1, 2, 8 and 9) and a release position (see FIG. 7). The container 22 includes latching arrangements 36 (see FIGS. 9. 11, 13 and 14) for securing the retention tabs 34 in the retention positions relative to the first and second container ends 26, 28.

The outer sleeve 24 is configured to slide lengthwise over an exterior of the container 22 and includes a sleeve length SL that extends between first and second sleeve ends 40, 42 (see FIG. 6) The outer sleeve 24 is positionable over the container 22 in an installed state (see FIGS. 1 and 2) in which the first sleeve end 40 is at the first container end 26 and the second sleeve end 42 is at the second container end 28. The retention tabs 34 are configured such that when the outer sleeve 24 is in the installed state and the retention tabs 34 are secured in the retention positions, retention portions 35 of the retention tabs 34 oppose the first and second sleeve ends to limit axial movement of the container 22 relative to the outer sleeve 24 (see FIGS. 1 and 2).

Figure 12:
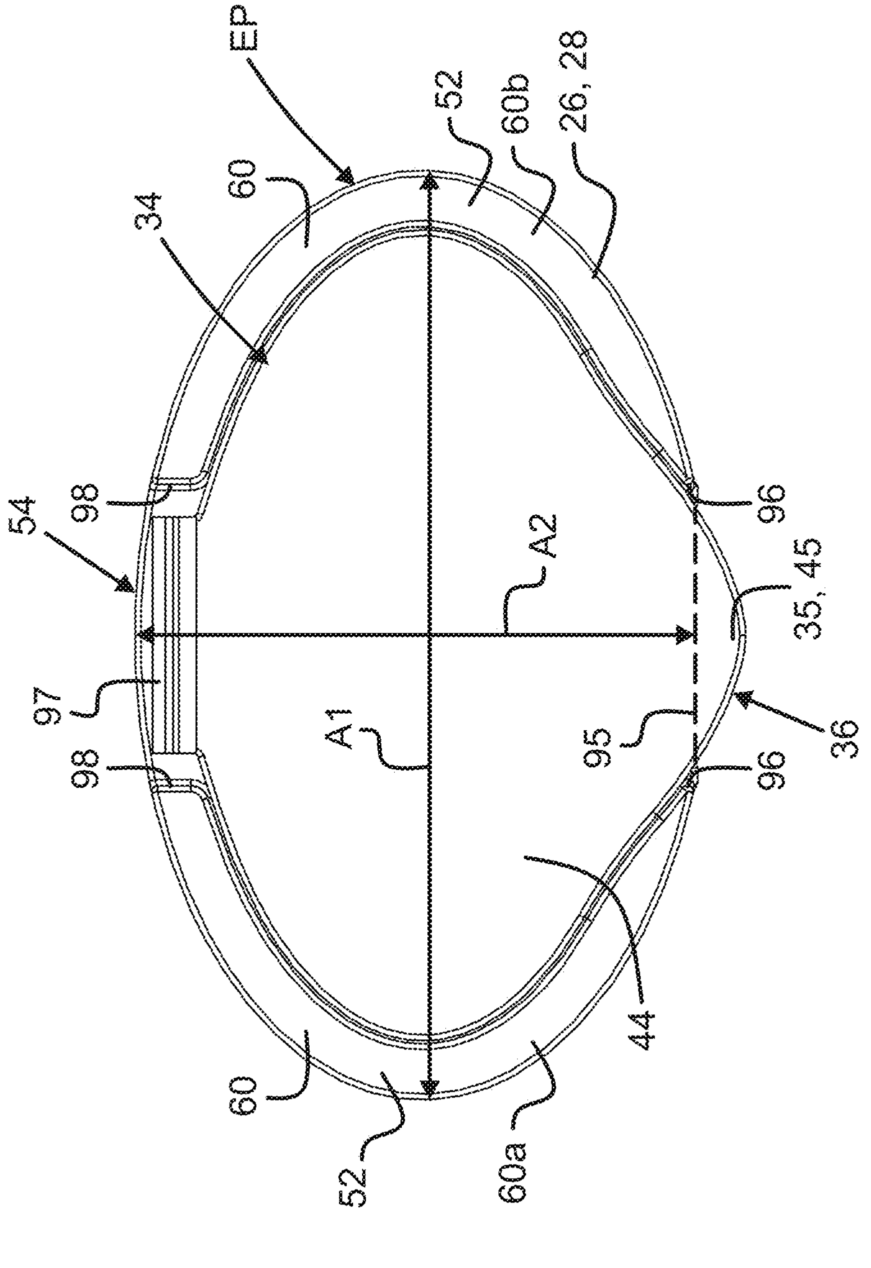
FIG. 12 is an end view of the container of FIG. 8.

The first and second container ends 26, 28 define container end profiles EP (see FIG. 12 where one of the container ends and one of the retention tabs is depicted; it will be appreciated that both container ends and both retention tabs of the container have the same configuration). Referring FIG. 12, the depicted retention tab 34 includes a main tab body 44 and the retention portion 35 forms a tab extension 45 that projects outwardly from the main tab body 44. When the retention tabs 34 are in the retaining positions, the main tab bodies 44 are inside a boundary defined by each container end profile EP and the tab extensions 45 defined by the retention portions 35 project outside the boundary defined by each container end profile EP (see FIG. 12). The first and second sleeve ends 40, 42 define end notches 46 (See FIG. 6). When the outer sleeve 24 is in the installed state and the retention tabs 34 are secured in the retention positions, the tab extensions 45 fit within the end notches 46 of the first and second sleeve ends 40, 42 (see FIGS. 1, 2, 4 and 5).

Figure 7:
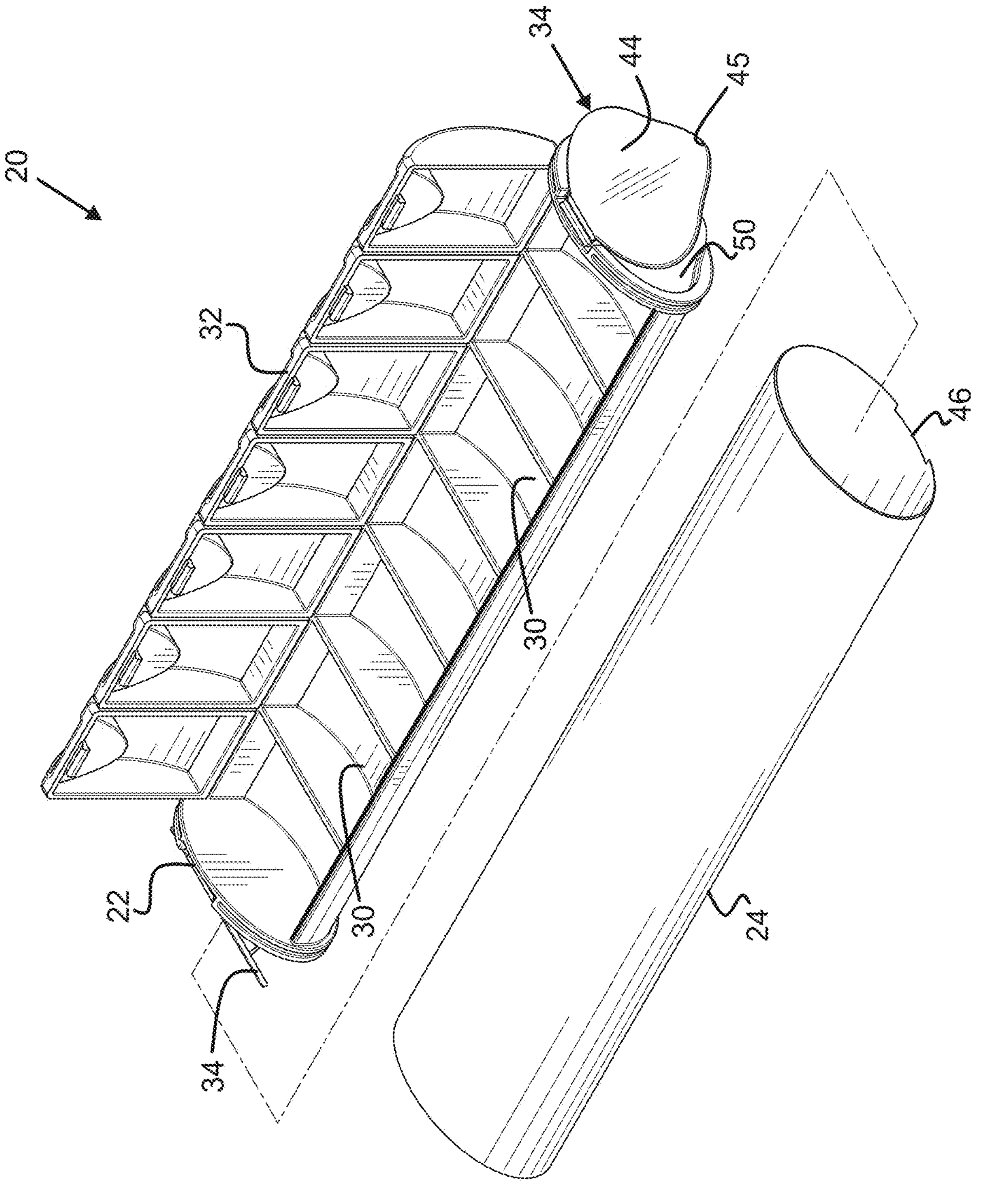
FIG. 7 is an exploded view of the container assembly of FIG. 1 with covers of a container of the container assembly shown in open positions.
Figure 8:
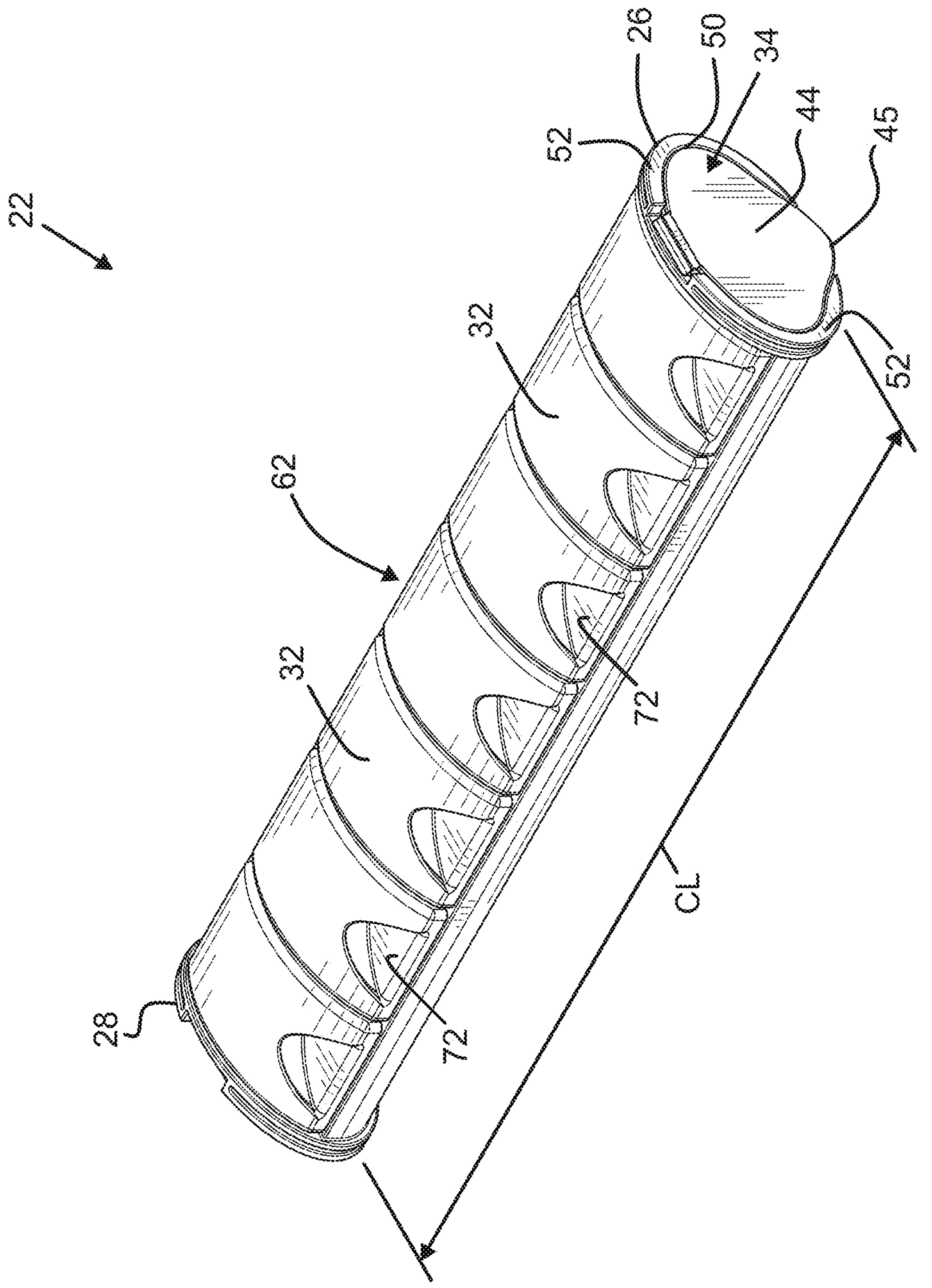
FIG. 8 is a top, end perspective view of a container of the container assembly of FIG. 1.

Referring to FIGS. 7 and 8, the first and second container ends 26, 28 define end recesses 50 for receiving the retention tabs 34. When the retention tabs 34 are secured in the retention positions (as shown at FIG. 8) the main tab bodies 44 fit within the end recesses 50. When the outer sleeve 24 is in the installed state and the retention tabs 34 are secured in the retention positions, the retention tabs 34 are axially flush with the first and second sleeve ends 40, 42 and are also flush with axially outwardly facing surfaces 52 defined by the first and second container ends 26, 28. The axially outward facing surfaces 52 extend around a majority of each of the end recesses 50 and face axially outwardly from the ends of the container 22.

Figure 13:
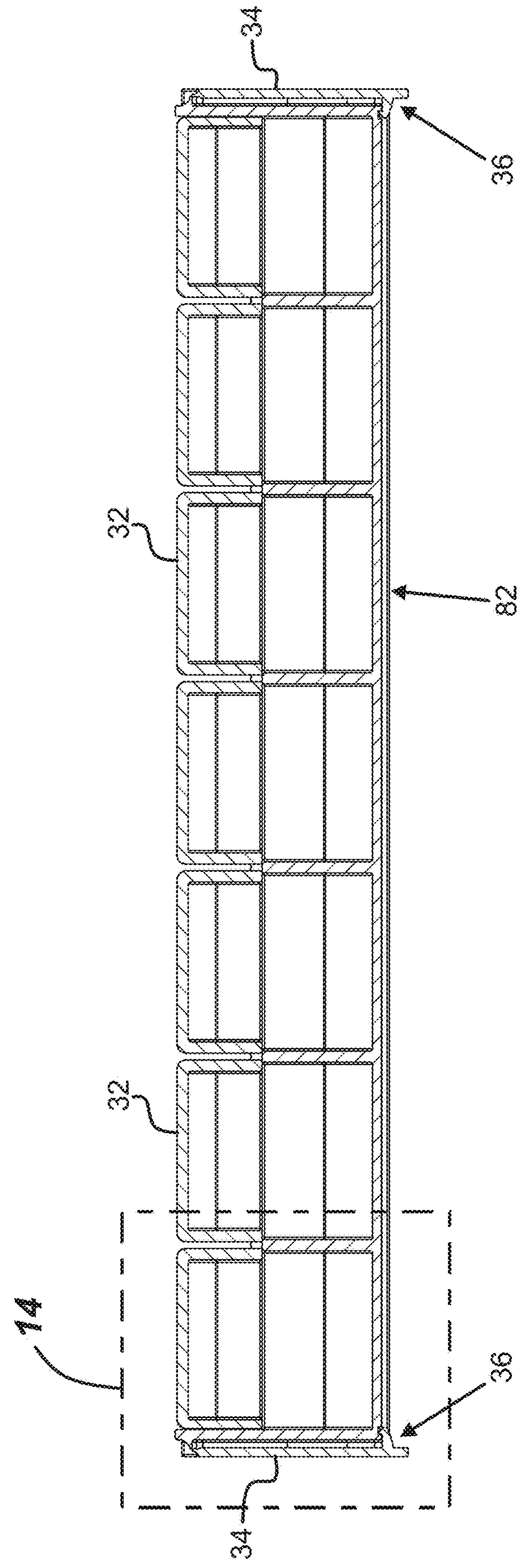
FIG. 13 is a cross-sectional view taken along section line 13-13 of FIG. 10.
Figure 14:
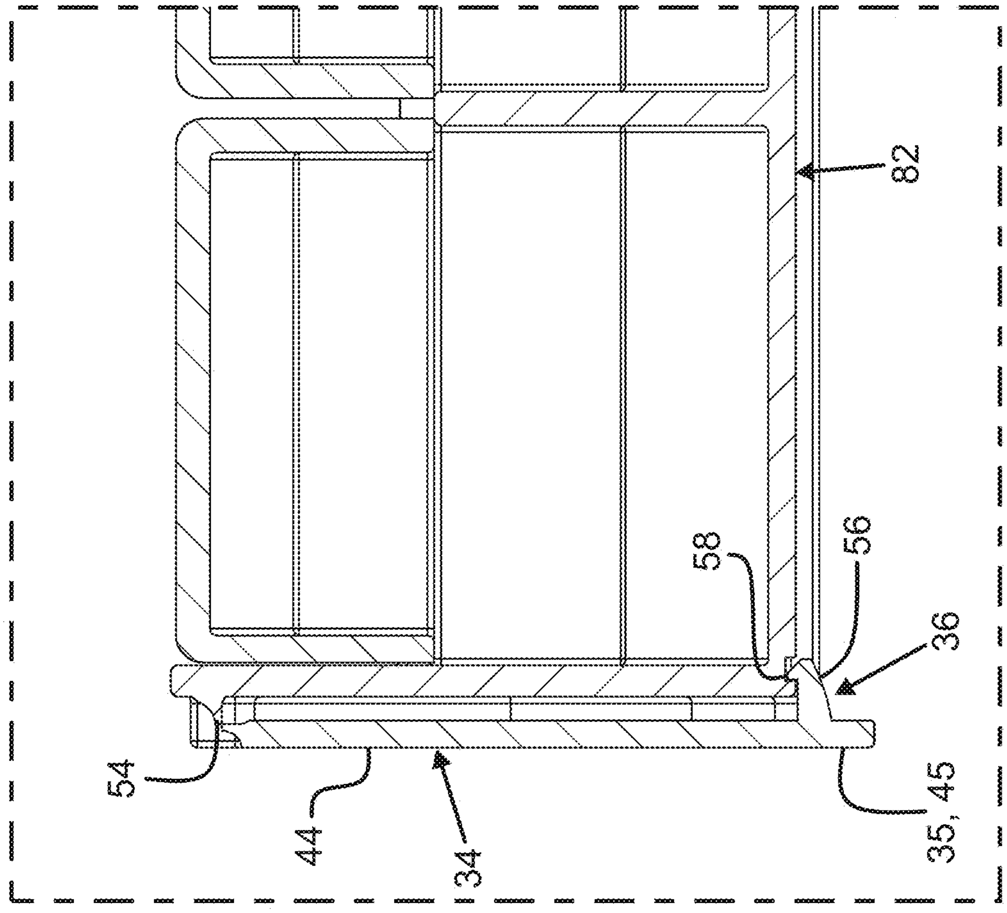
FIG. 14 is an enlarged view of a portion of FIG. 13.

Referring to FIGS. 13 and 14, the retention tabs 34 are pivotally connected to the first and second container ends 26, 28 by living hinges 54. Additionally, as also shown at FIGS. 13 and 14, the latching arrangements 36 can include cantilever latches 56 integrated with the retention tabs 34 at the tab extensions 45. The latching arrangements 36 are depicted including catches 58 defined by the first and second container ends 26, 28 for engaging with the cantilever latches 56 to secure the retention tabs 34 in the retention positions with the end recesses 50. It will be appreciated that the depicted latching arrangement 36 is a snap-fit type arrangement and that other types of latching arrangements, whether snap fit or not, could also be used. The cantilever latches 56 can have a resilient construction with base ends unitarily formed with the retention tabs 34 that are resiliently biased toward a latched state and that can be flexed from the latched state to disengage from the catches 58 or to allow for engagement with the catches 58 (e.g., ramped surfaces can cause the cantilever latches 56 to ramp over the catches 58 to an engaged state when the retention tabs 34 are pivoted from the release position to the retention position.

Figure 4:
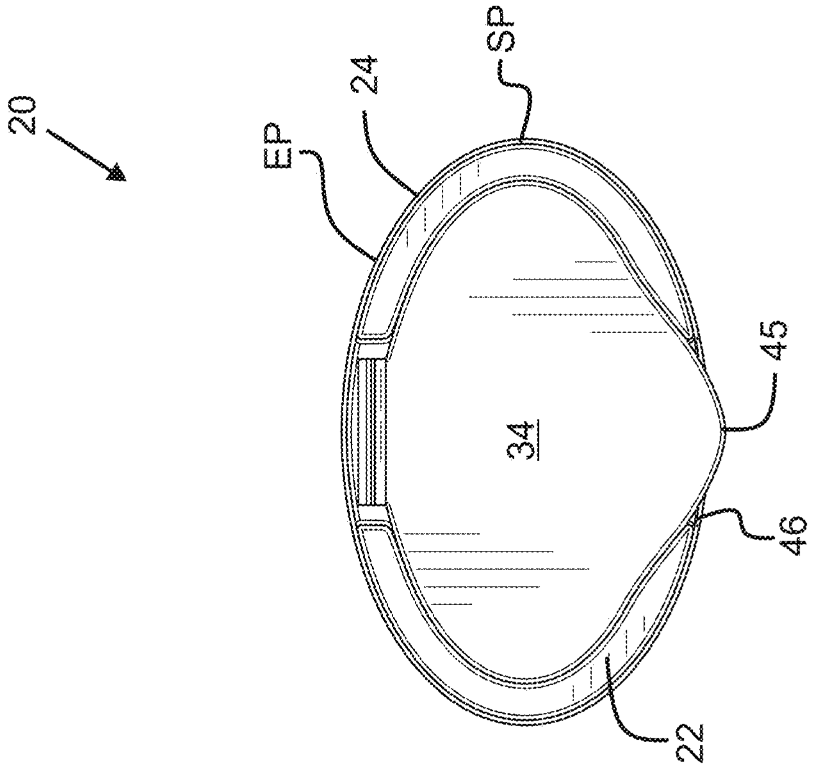
FIG. 4 is an end view of the container assembly of FIG. 1.
Figure 5:
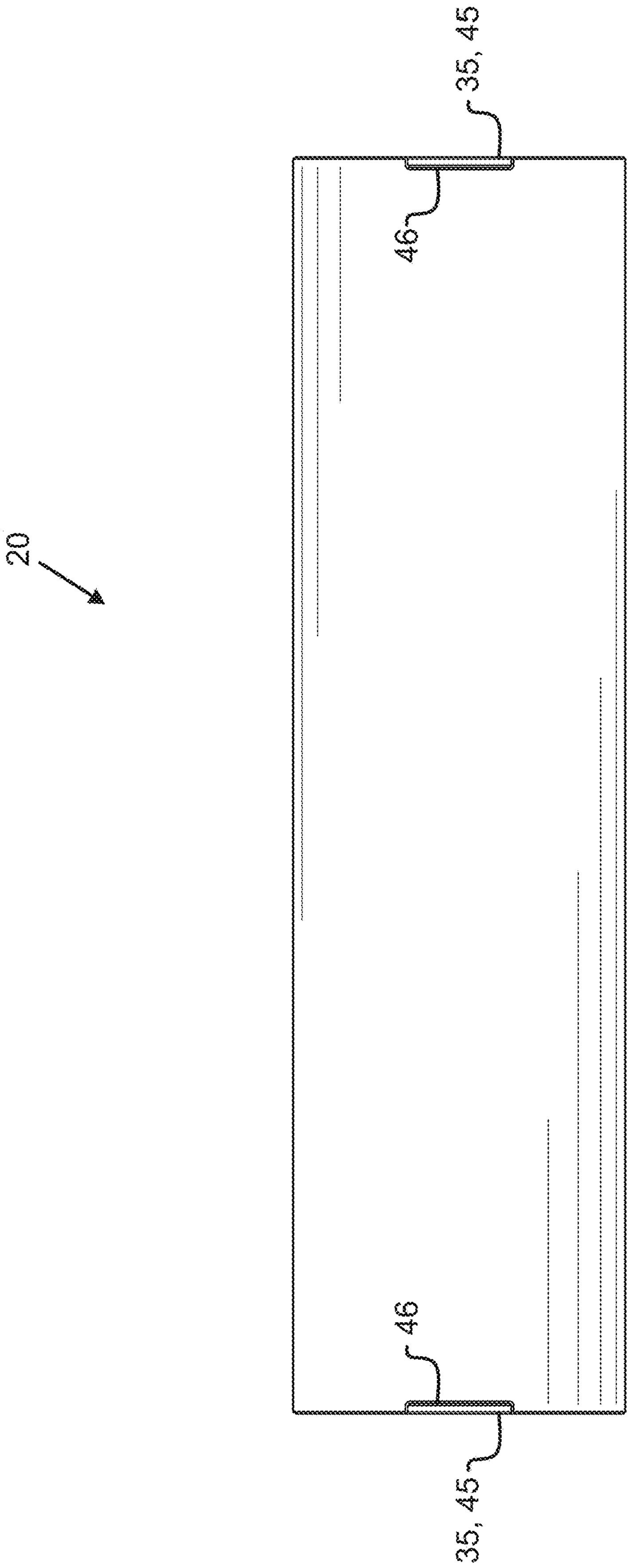
FIG. 5 is a bottom view of the container assembly of FIG. 1.

Referring to FIG. 4, the outer sleeve 24 defines an outer sleeve profile SP. When the outer sleeve 24 is in the installed state and the retention tabs 34 are secured in the retention positions, the tab extensions 45 extend laterally outwardly beyond the outer sleeve profile SP to provide finger access that facilitates manually unlatching the cantilever latches. By manually pulling the tab extensions 45, the cantilever latches 56 and/or the retention tabs 34 can be resiliently flexed to cause the cantilever latches 56 to disengage from the catches 58.

As depicted herein, the container end profiles EP as well as the outer sleeve profile SP are oval. As shown at FIG. 12, the container end profiles EP define major and minor axes A1, A2. The living hinges 54 are positioned on opposite sides of the major axes A1 from the latching arrangements 36. In one example, the aspect ratio of the major axis A1 to the minor axis A2 is in the range of 1.1-1.3.

Figure 9:
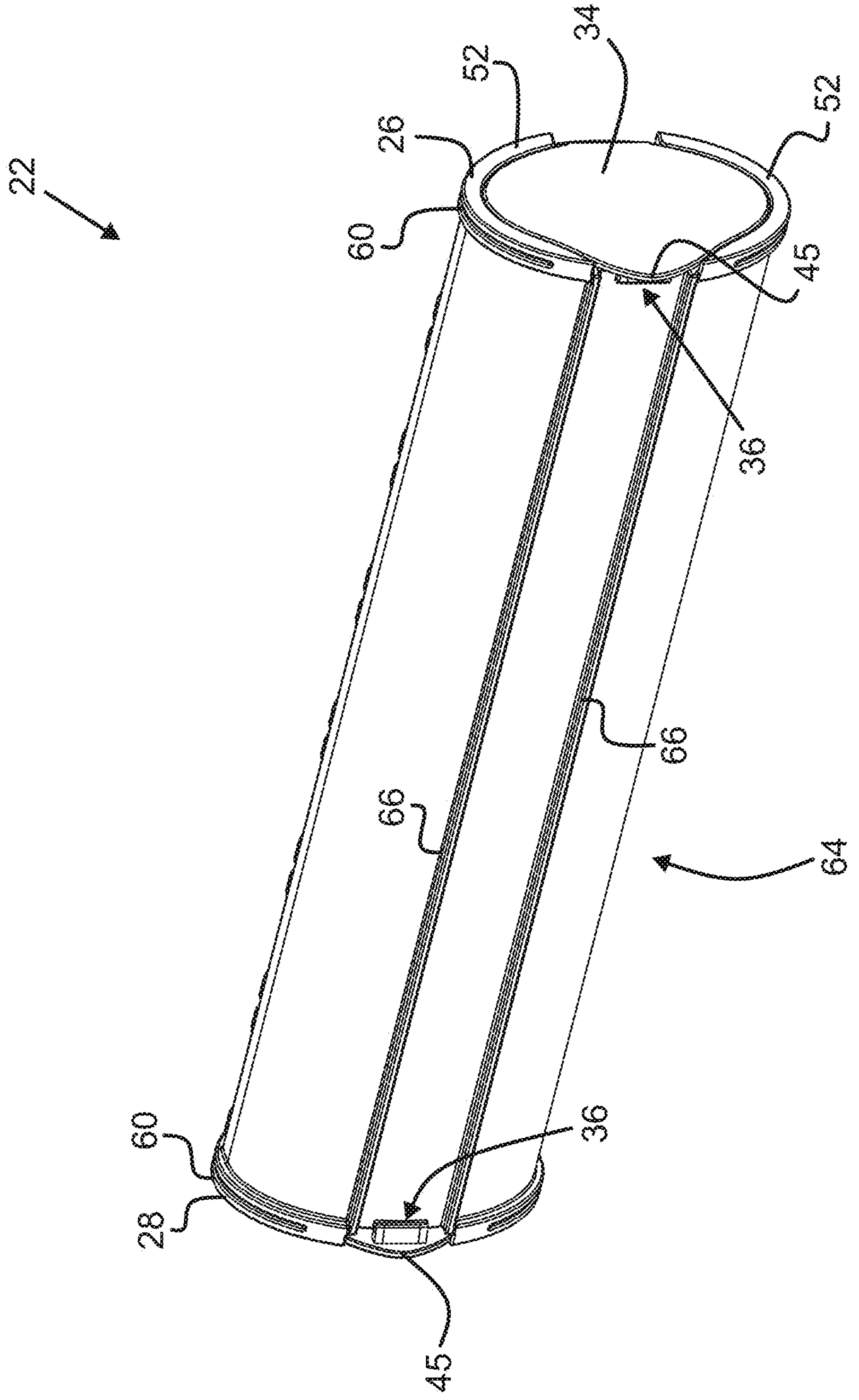
FIG. 9 is a bottom, end perspective view of the container of FIG. 8.
Figure 10:
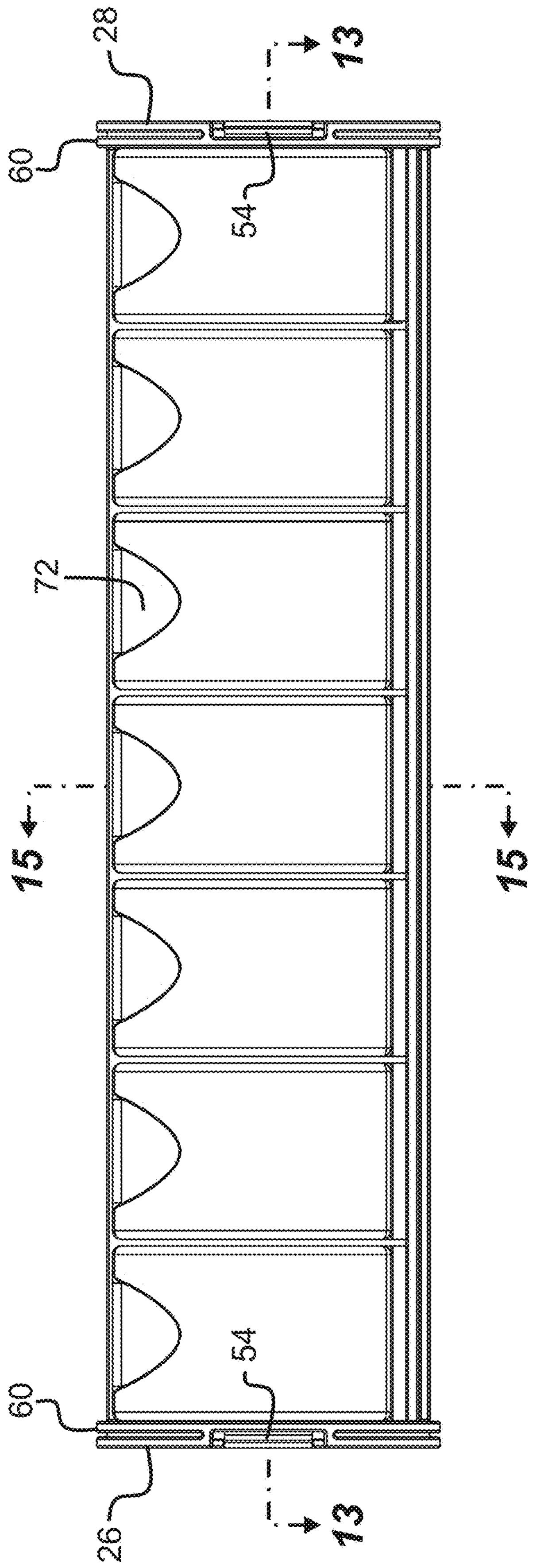
FIG. 10 is a top view of the container of FIG. 8.
Figure 11:
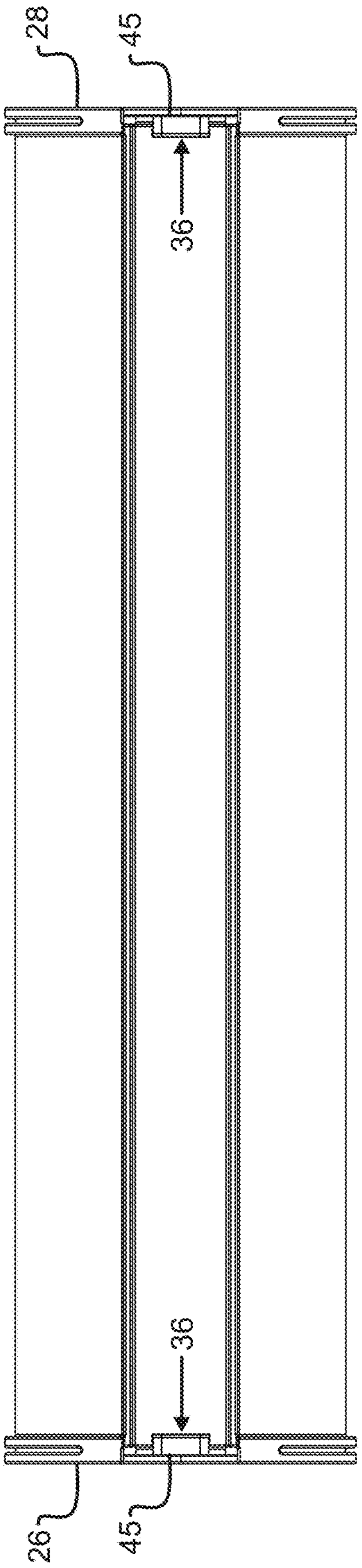
FIG. 11 is a bottom view of the container of FIG. 8.
Figure 16:
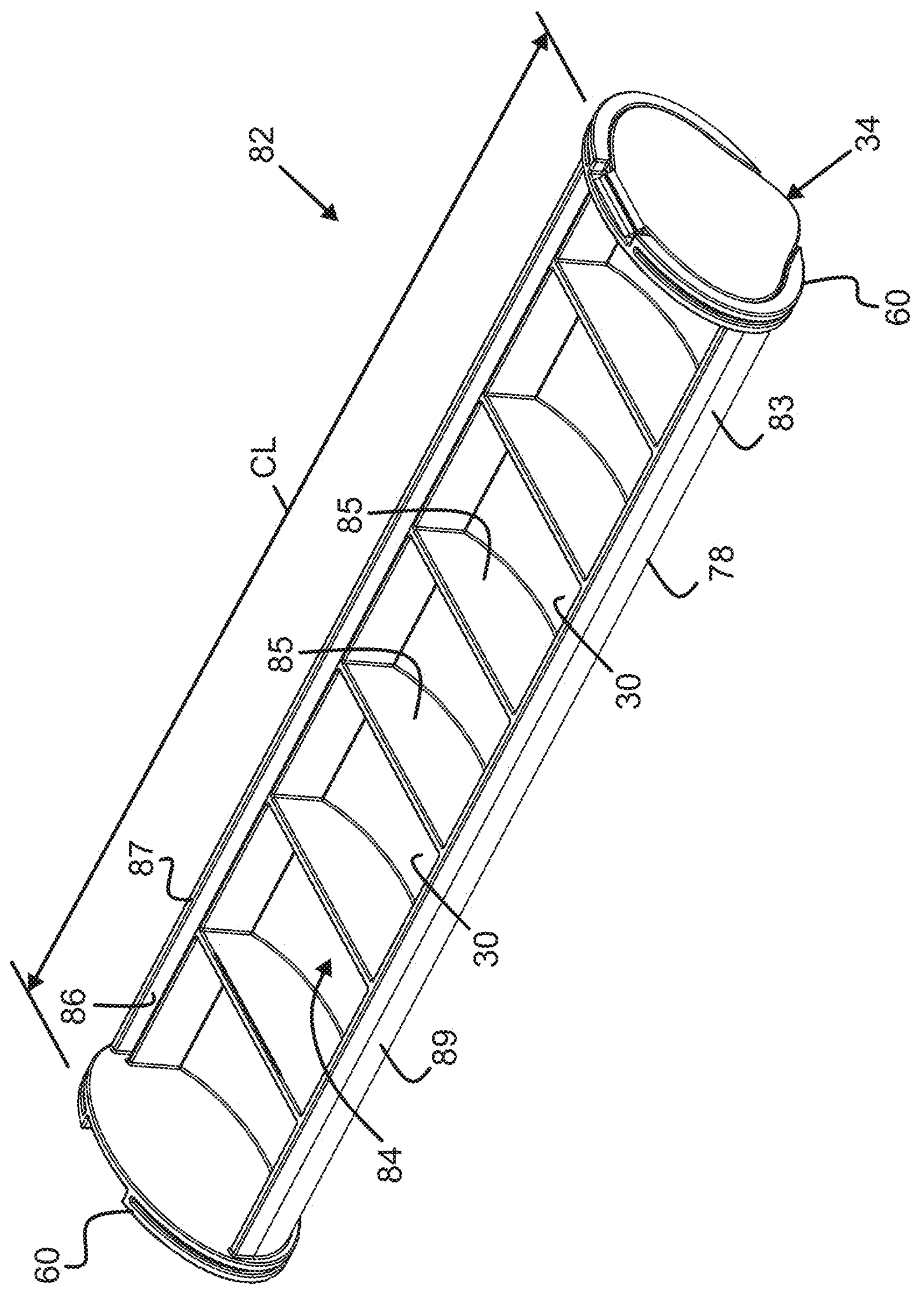
FIG. 16 is a perspective view of a base of the container of FIG. 8.

The container 22 includes lateral end flanges 60 at the first and second container ends 26, 28 (see FIGS. 9, 10 and 16). The container 22 includes a top side 62 (see FIG. 8) and a bottom side 64 (see FIG. 9). The covers 32 are positioned at the top side 62 of the container 22 between the lateral end flanges 60. The bottom side 64 of the container 22 includes exterior longitudinal stabilization ribs 66 that extend along the container length CL between the first and second container ends 26, 28. In one example, laterally outermost portions of the exterior longitudinal stabilization ribs 66 are flush with the container end profiles EP defined by the lateral end flanges 60. The exterior longitudinal stabilization ribs 66 are configured for supporting the container 22 when the outer sleeve 24 is fully removed from the container 22 and the container 22 placed bottom side down on a flat surface with the retention tabs 34 in the release positions. In this way, the container 22 can be supported in stable manner when placed on a flat surface such as a table or countertop while one or more of the covers 32 are opened to allow access the corresponding storage compartments 30 of the container 22.

Figure 6:
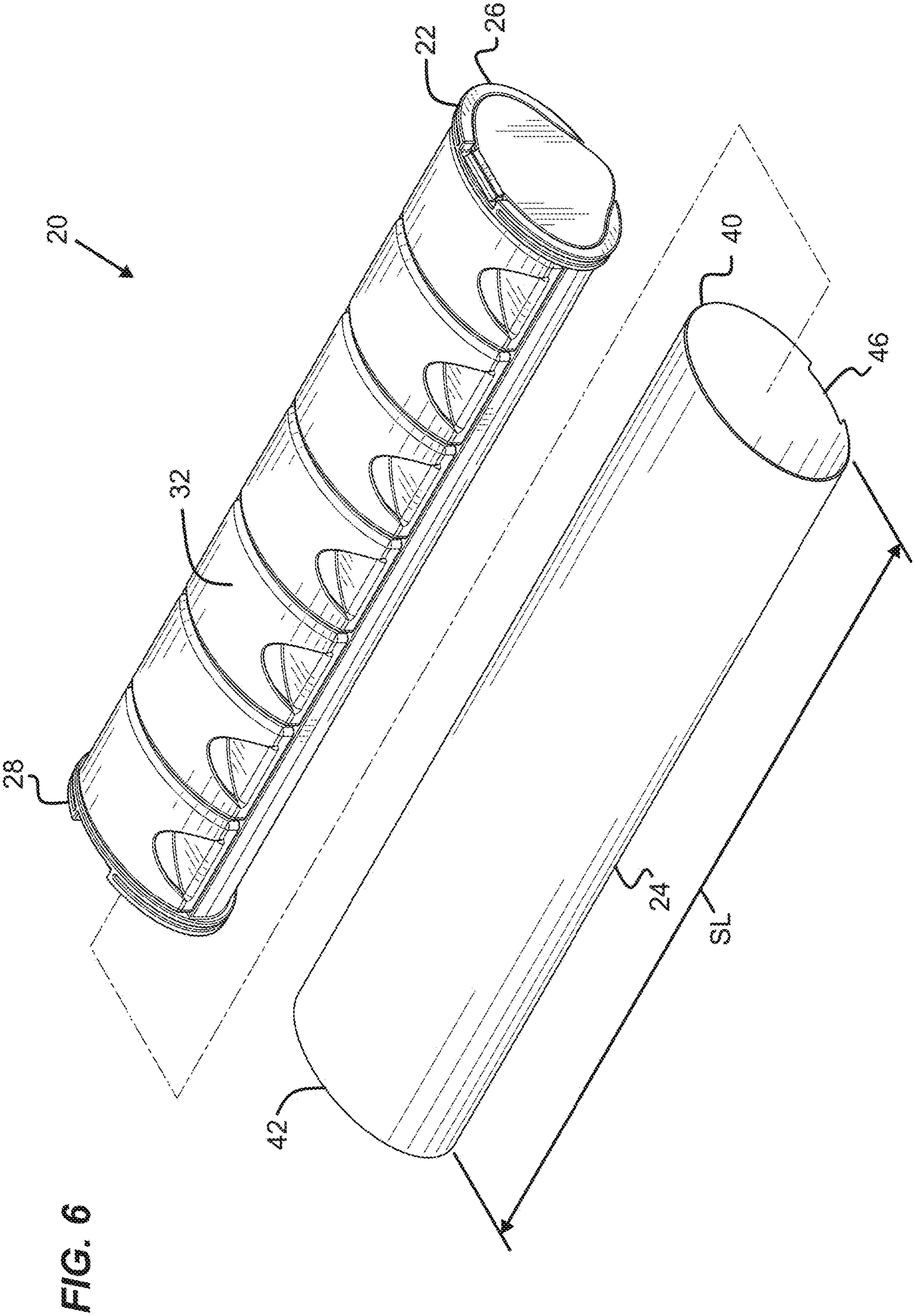
FIG. 6 is an exploded view of the container assembly of FIG. 1.
Figure 15:
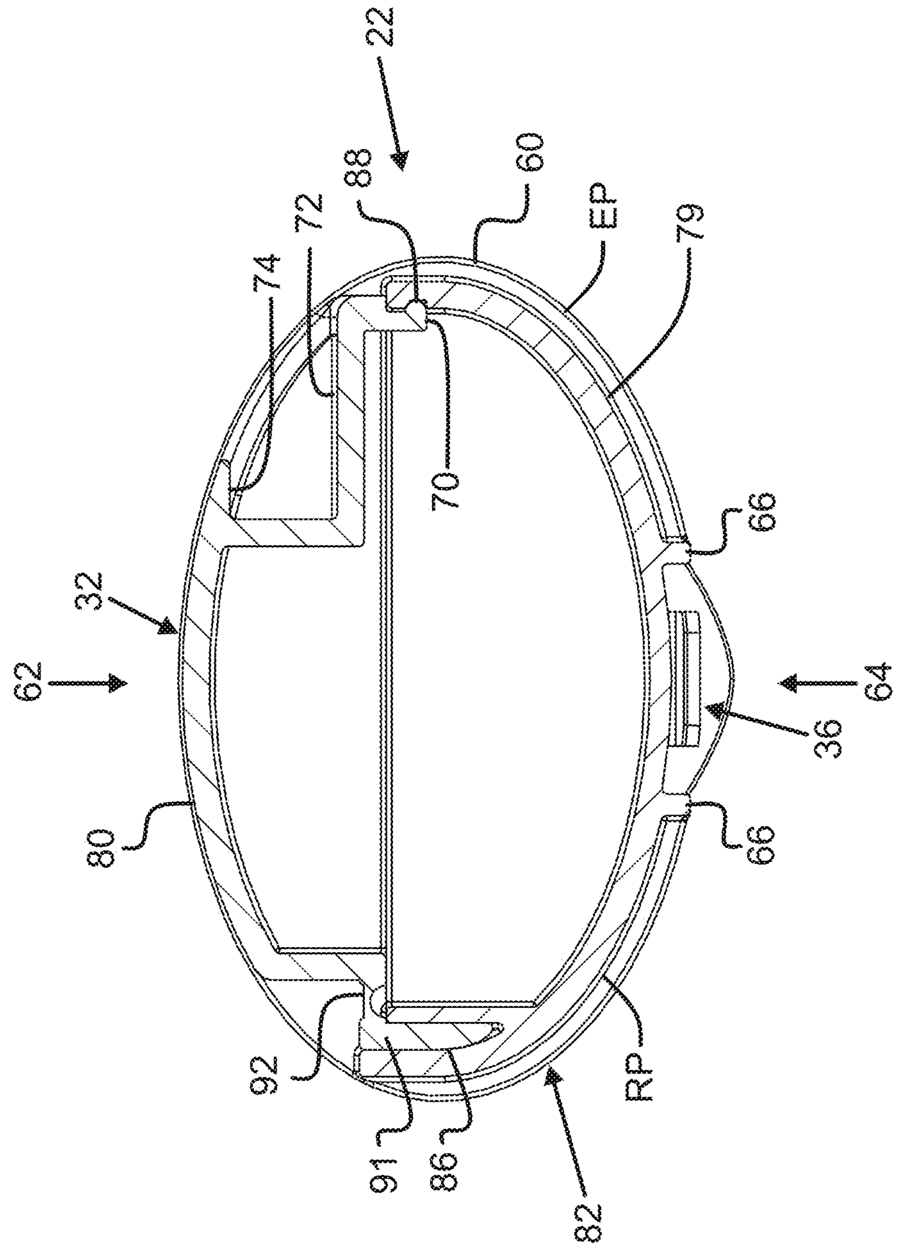
FIG. 15 is a cross-sectional view taken along section line 15-15 of FIG. 10.
Figure 19:
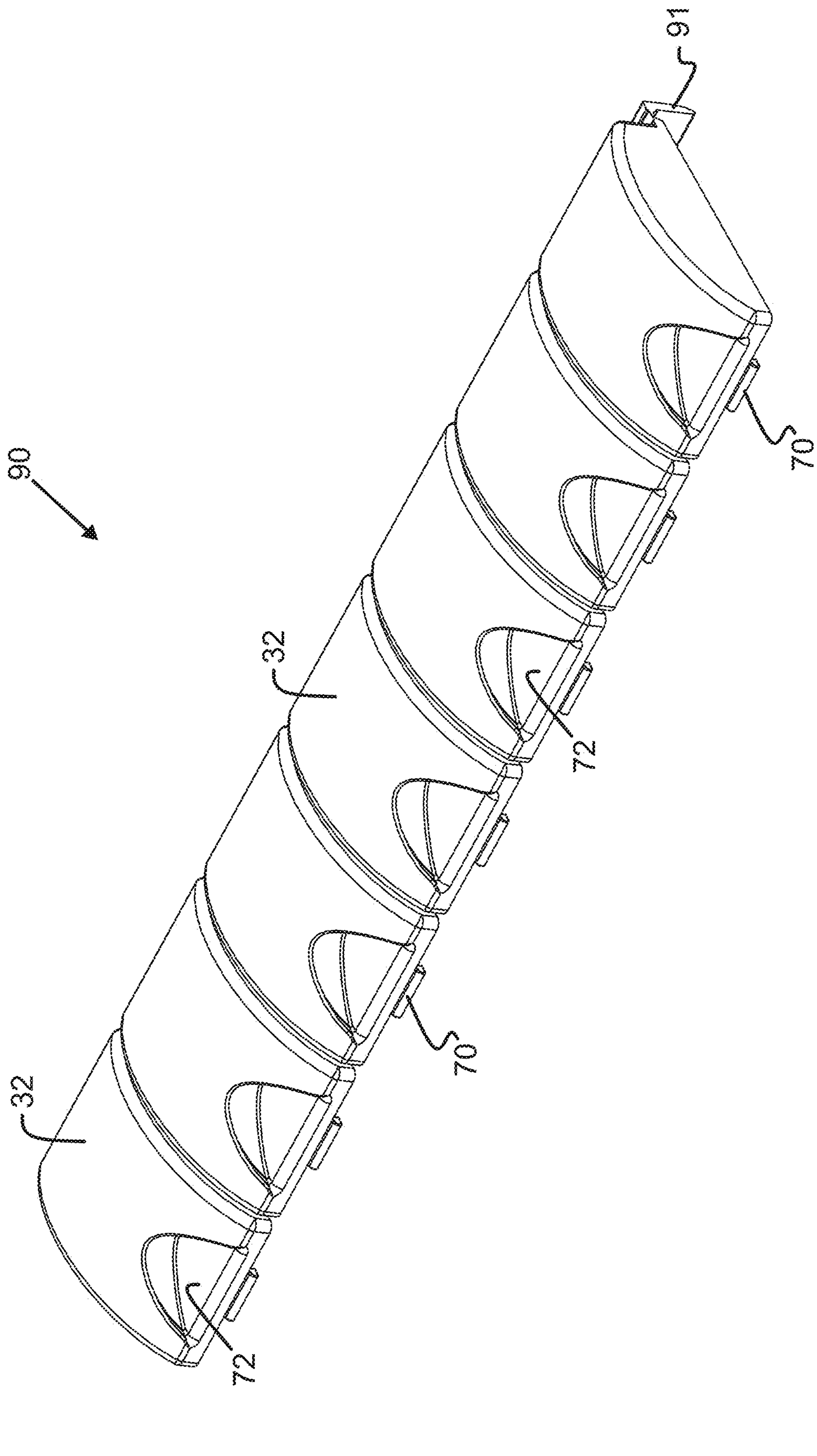
FIG. 19 is a top, end perspective view of a cover assembly of the container of FIG. 8.
Figure 20:
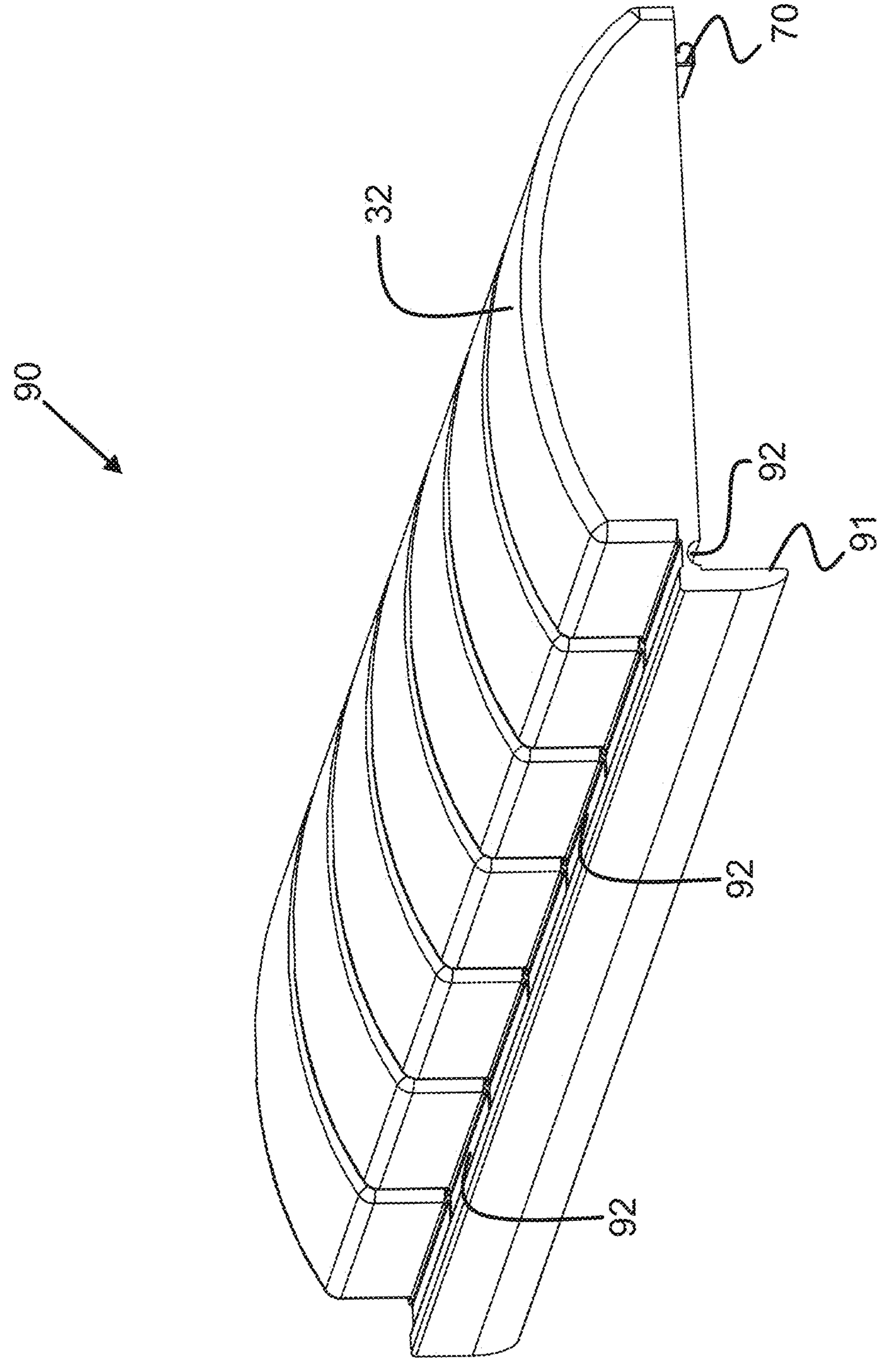
FIG. 20 is another top, end perspective view of the cover assembly of FIG. 19.
Figure 21:
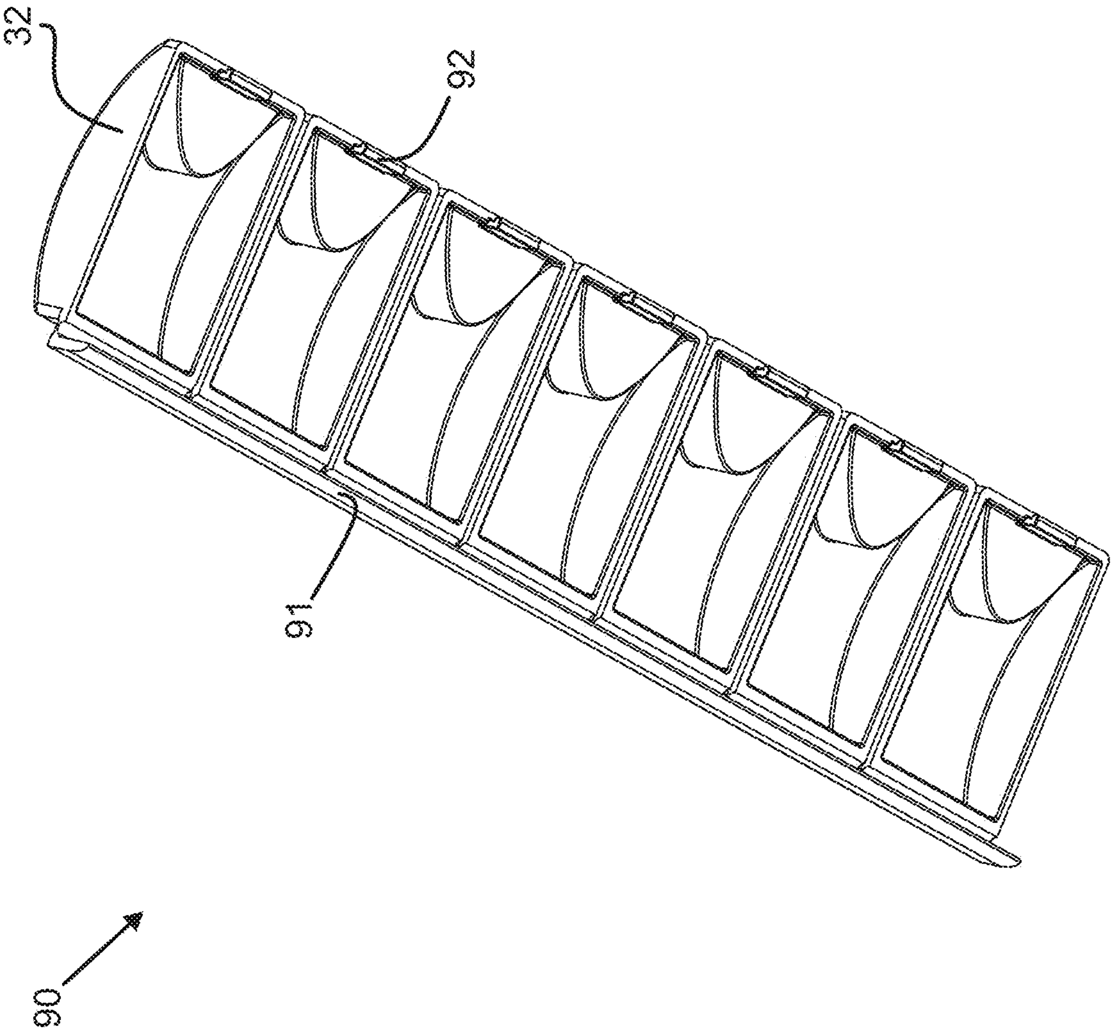
FIG. 21 is a bottom, end perspective view of the cover assembly of FIG. 19.
Figure 22:
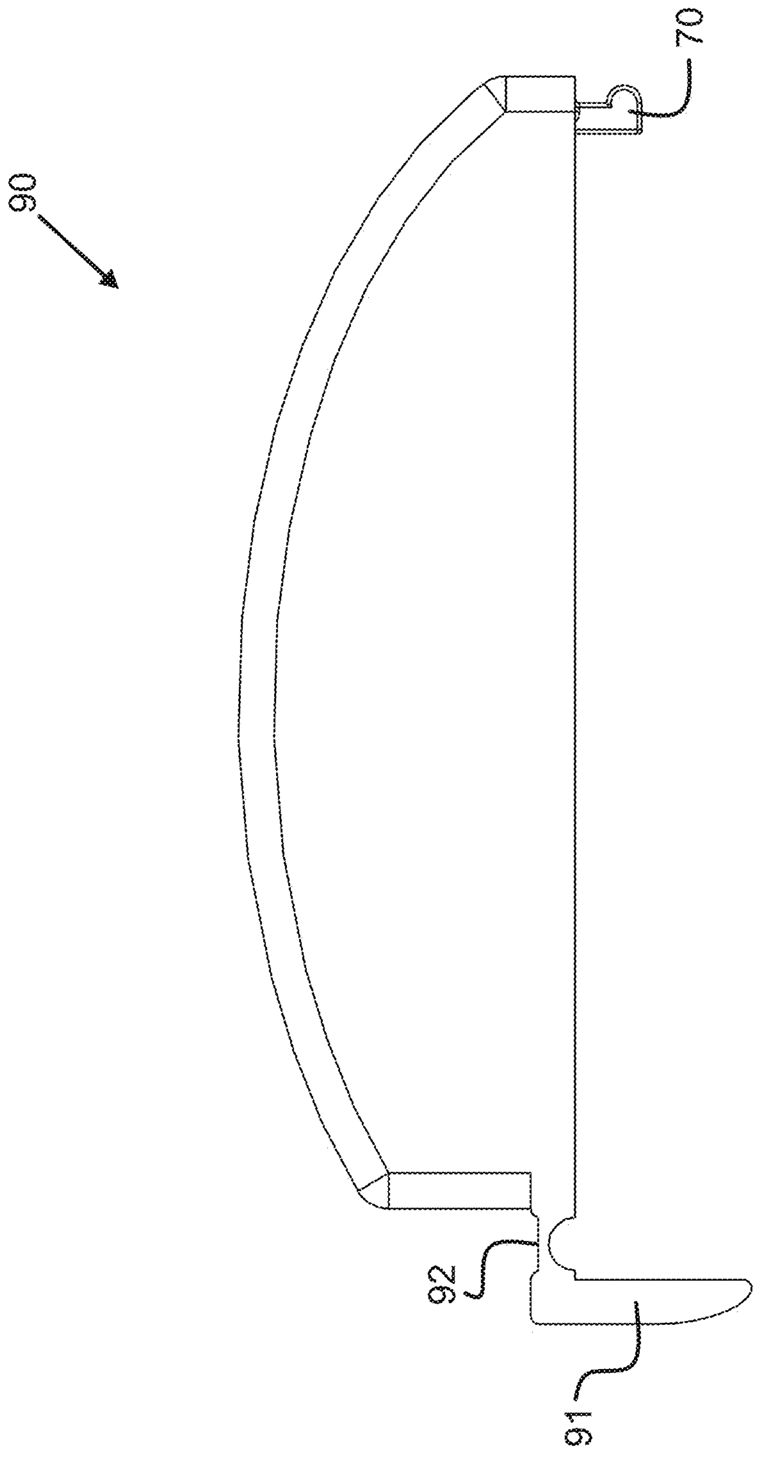
FIG. 22 is an end view of the cover assembly of FIG. 19.
Figure 23:
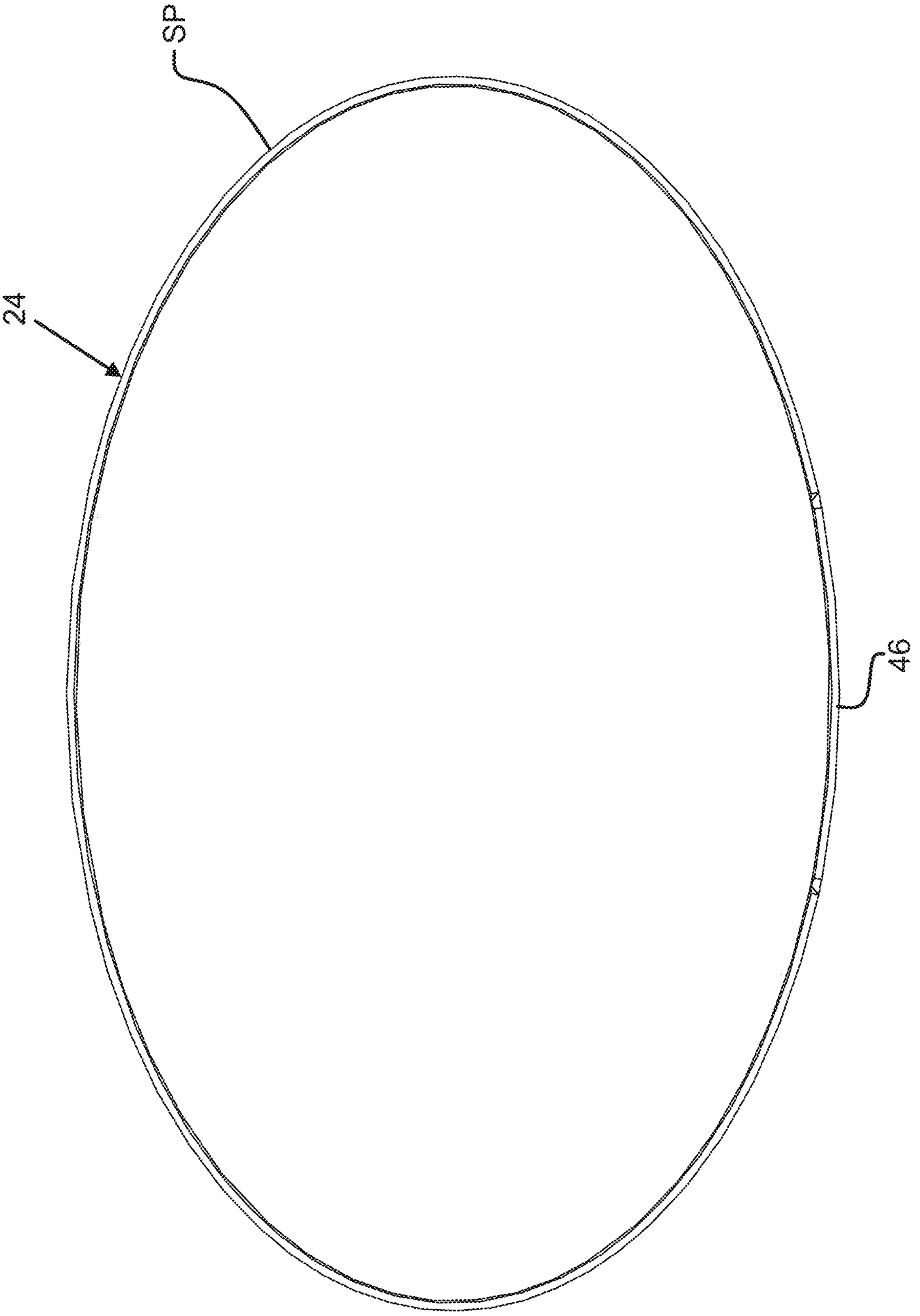
FIG. 23 is an end view of an outer sleeve of the cover assembly of FIG. 1.

The covers 32 are pivotally moveable between open positions (see FIG. 7) and closed positions (see FIG. 6). Cover latches 70 (See FIG. 19) are provided for latching the covers 32 in the closed positions. Tops of the covers 32 define finger recesses 72 including finger grips 74 (see FIG. 15) for facilitating manually opening the covers. Advantageously, the recessed configuration of the finger grips 74 prevents the finger grips 74 from extending outside the boundary defined by the end profiles EP when the covers 32 are in the closed positions.

As described above, the lateral end flanges 60 define an oval profile of the container (e.g., end profile EP). The container 22 also defines a reduced profile RP (sec FIG. 15) along a longitudinal region 78 (see FIG. 16) that extends between the lateral end flanges 60. The reduced profile RP has a first portion 79 (see FIG. 15) at the bottom side 64 of the container 22 that is laterally inwardly inset with respect to the oval profile EP defined by the lateral end flanges 60. The exterior longitudinal stabilization ribs 66 project laterally outwardly from the first portion 79 of the reduced profile RP. The reduced profile RP has a second portion 80 at the top side 62 of the container 22 that aligns with the oval profile EP defined by the lateral end flanges 60 of the container 22. It will be appreciated that while the reduced profile RP has an overall reduced profile, the first portion 79 provides the reduction in profile. The second portion 80 is defined by the covers 32.

Figure 17:
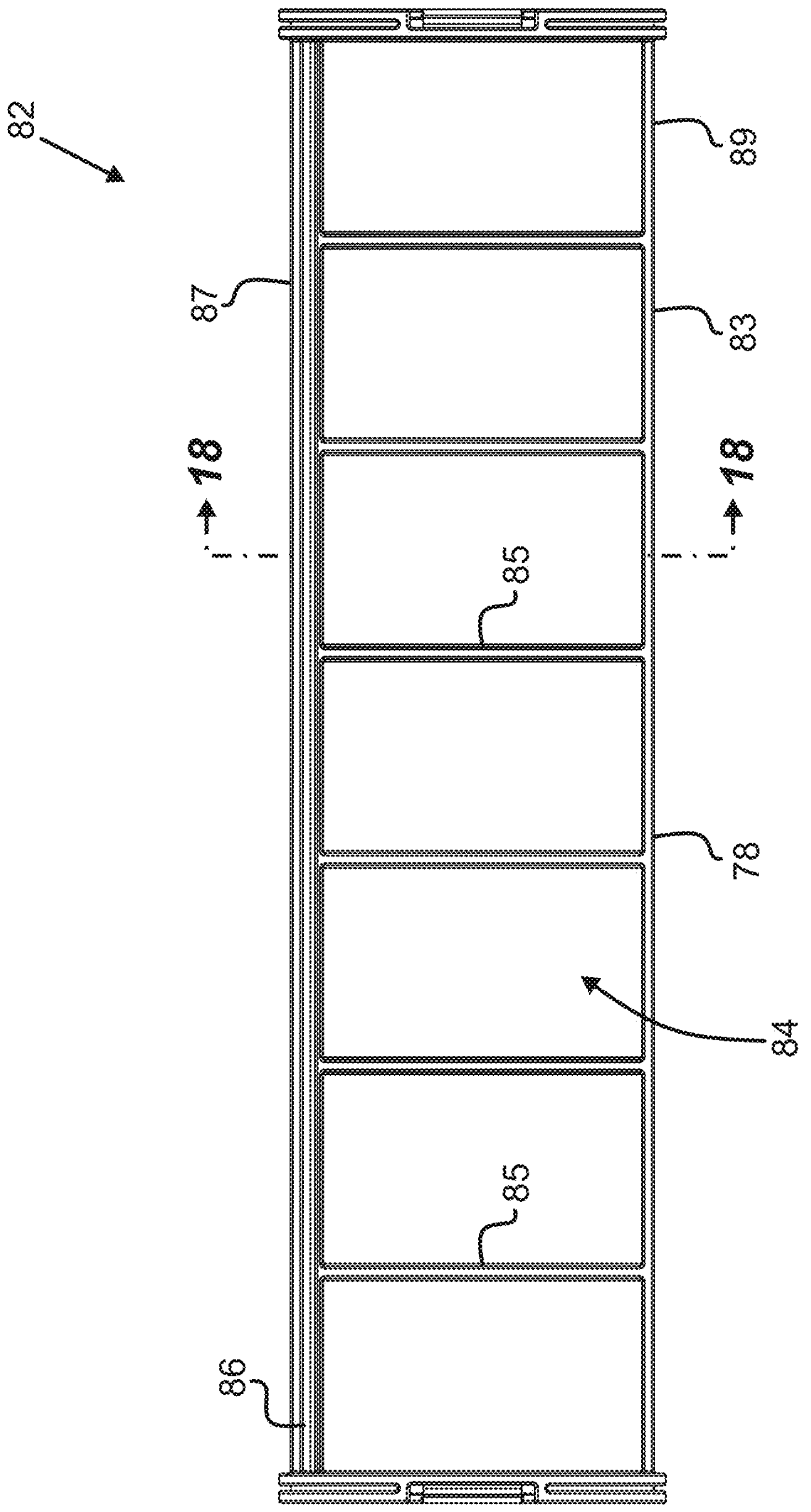
FIG. 17 is a top view of the base of FIG. 16.
Figure 18:
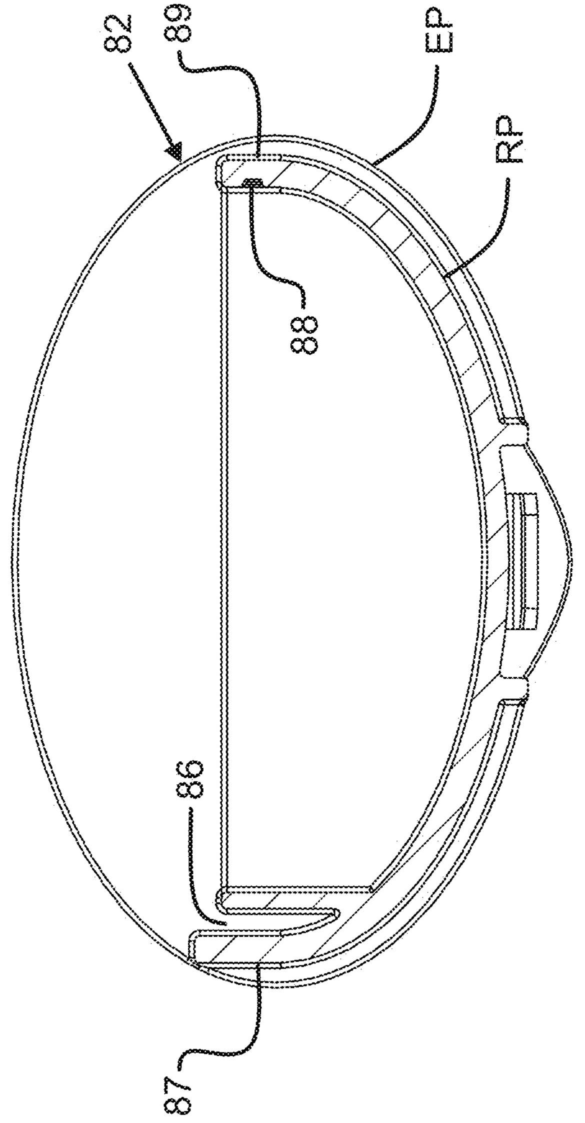
FIG. 18 is a cross-sectional view taken along section line 18-18 of FIG. 17.

The container 22 includes a base 82 (see FIGS. 16-18) and a cover assembly 90 (see FIGS. 19-22). The base 82 includes a main base body 83 that extends along the container length CL between the first and second container ends 26, 28. The main base body 83 defines an inner storage volume 84. The base 82 includes divider walls 85 unitary with the main base body 83 that divide the inner storage volume 84 into separate regions corresponding to the row of storage compartments 30. The base 82 includes the lateral end flanges 60 at the first and second container ends 26, 28 that are unitary with the main base body 83. The main base body 83 defines a longitudinal cover mounting slot 86 adjacent a first longitudinal side 87 of the main base body 83 and cover latch catches 88 adjacent an opposite second longitudinal side 89 of the main base body 83.

Referring to FIGS. 19-22, the covers 32 are part of a cover assembly 90 including an elongate attachment member 91 and living hinges 92 that couple the covers 32 to the elongate attachment member 91. The elongate attachment member 91 is secured in the longitudinal cover mounting slot 86 (e.g., by a press-fit or snap-fit connection) to pivotally attach the covers 32 of the cover assembly 90 to the base 82. The covers 32 include the cover latches 70 adapted to engage the cover latch catches 88 of the main base body 83 to secure the covers 32 in closed positions with respect to the base 82.

The covers 32 are located at a top side 62 of the container 22. The base 82 defines the bottom side 64 of the container 22. The lateral end flanges 60 each include a first and second flange segments 60*a*, 60*b* (shown in FIG. 12) that each extend from the top side 62 to the bottom side 64 of the container 22. When the retention tabs 34 are in the retaining positions the main tab bodies 44 are inside a boundary defined by each container end profile EP and the tab extensions 45 project through first spaces 95 between first ends 96 of the first and second flange segments 60*a*, 60*b* to locations outside the boundary defined by each container end profile EP. The retention tabs 34 are pivotally connected to the first and second container ends 26, 28 by living hinges 54 located at second spaces 97 (See FIG. 12) defined between second ends 98 (See FIG. 12) of the first and second flange segments 60*a*, 60*b*.

When the outer sleeve 24 is in the installed state over the container 22 with the retention tabs 34 secured in the retention positions, the storage compartments 30 adjacent the first sleeve end 40 can be accessed by moving the retention tab 34 at the second container end 28 to the release position and pushing the container 22 partially through the outer sleeve 24 in an axial direction toward the first sleeve end 40 to expose the storage compartments 30 adjacent the first sleeve end 40. The covers 32 of the exposed storage compartments 30 can then be opened. When the outer sleeve 24 is in the installed state over the container 22 with the retention tabs 34 secured in the retention positions, the storage compartments 30 adjacent the second sleeve end can be accessed by moving the retention tab 34 at the first container end 26 to the release position and pushing the container 22 partially through the outer sleeve 24 in an axial direction toward the second sleeve end 42 to expose the storage compartments 30 adjacent the second sleeve end 42. The covers 32 of the exposed storage compartments 30 can then be opened. After the desired compartment has been accessed, the cover or covers can be closed and the container 22 can be pushed back to the installed position and the corresponding retention tab 34 can be latched back into the retention position. Alternatively, when the outer sleeve 24 is in the installed state over the container 22 with the retention tabs 34 secured in the retention positions, the storage compartments 30 can be accessed by moving the retention tabs 34 to the release positions and then using one of the retention tabs 34 as a handle to pull the container 22 fully or partially from the outer sleeve 24. Once the desired storage compartment 30 or storage compartments 30 have been accessed, the corresponding covers 32 are closed and the container 22 is loaded back into the outer sleeve 24 and position at the installed state within the outer sleeve 24. The retention tabs 34 are then re-latched with respect to the first and second ends 26, 28 of the container 22 to lock the container 22 in place within the outer sleeve 24.

In a preferred example, the container 22 is a pill storage container. In the depicted example, seven of the storage compartments 30 are defined by the container. The seven storage compartments 30 can correspond to days of the week and can be provided with indicia (e.g., on the covers) to indicate the days of the week. The indicia can include numbers and/or words and/or abbreviations indicative of the days of the week.

The outer sleeve 24 can have a metallic construction (e.g., an aluminum construction). In one example, the outer sleeve 24 can have an extruded metal (e.g., aluminum) construction. The extruded sleeve can be cut to length, processed to include the end notches 46, and then anodized. In other examples, the outer sleeve 24 can have a plastic construction (e.g., made of a plastic material that in certain examples can have a metallic appearance). The base 82 can have a unitary, one-piece, molded plastic construction. The cover assembly 90 can have a unitary, one-piece, molded plastic construction. In certain examples, the base 82 and/or the cover assembly can include a material composition that includes a polymeric material such as polypropylene.

Variations in the shapes and relative sizes of the various components disclosed herein can be made without departing from the scope and spirit of the present disclosure. For example, aspects of the present disclosure are applicable to container assemblies have profile shapes other than oval such as circular shapes, square shapes, rectangular shapes or other shapes. However, the particular configuration shown in FIGS. 1-7 is preferred because it is eye-catching and attractive, in addition to being distinctive in appearance. In particular, the configuration of FIGS. 1-7 has an attractive and distinctive appearance that is not immediately recognizable as a pill container.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A container assembly comprising:

a container including a first container end and a second container end, the container including a container length that extends between the first and second container ends, the container defining storage compartments positioned in a row along the container length between the first and second container ends, the container also including a plurality of covers for covering the storage compartments and for allowing the storage compartments to be individually opened, the container further including retention tabs respectively carried with the first and second container ends, the retention tabs each being pivotally moveable relative to their respective first and second container end between a retention position and a release position, the first and second container ends defining container end profiles;

the retention tabs including main tab bodies and include tab extensions that project outwardly from the main tab bodies;

and wherein when the retention tabs are in the retention positions, the main tab bodies are inside a boundary defined by each container end profile and the tab extensions project outside the boundary defined by each container end profile, the container including latching arrangements for securing the retention tabs in the retention positions relative to the first and second container ends; and an outer sleeve configured to slide lengthwise over an exterior of the container, the outer sleeve including first and second sleeve ends, the outer sleeve being positionable over the container in an installed state in which the first sleeve end is at the first container end and the second sleeve end is at the second container end, wherein the retention tabs are configured such that when the outer sleeve is in the installed state and the retention tabs are secured in the retention positions, the tab extensions of the retention tabs oppose the first and second sleeve ends to limit axial movement of the container relative to the outer sleeve, and wherein when the outer sleeve is in the installed state and the retention tabs are secured in the retention positions the retention tabs are axially flush with the first and second sleeve ends.

2. The container assembly of claim 1, wherein the first and second sleeve ends define end notches, and wherein when the outer sleeve is in the installed state and the retention tabs are secured in the retention positions, the tab extensions fit within the end notches of the first and second sleeve ends.

3. The container assembly of claim 2, wherein the first and second container ends define end recesses, and wherein when the retention tabs are secured in the retention positions the main tab bodies fit within the end recesses.

4. The container assembly of claim 3, wherein when the outer sleeve is in the installed state and the retention tabs are secured in the retention positions, the retention tabs are axially flush with the first and second sleeve ends.

5. The container assembly of claim 2, wherein the retention tabs are pivotally connected to the first and second container ends by living hinges, and wherein the latching arrangements secure the retention tabs in the retention positions.

6. The container assembly of claim 5, wherein the outer sleeve defines an outer sleeve profile, and wherein when the outer sleeve is in the installed state and the retention tabs are secured in the retention positions the tab extensions extend laterally outwardly beyond the outer sleeve profile to provide finger access that facilitates manually unlatching the latching arrangements.

7. The container assembly of claim 6, wherein the container end profiles are oval, wherein the outer sleeve profile is oval, wherein the container end profiles define major and minor axes, and wherein the living hinges are positioned on opposite sides of the major axes from the latching arrangements.

8. The container assembly of claim 1, wherein the container includes lateral end flanges at the first and second container ends, wherein the container includes a top side and a bottom side, wherein the covers are positioned at the top side of the container between the lateral end flanges, wherein the bottom side of the container includes exterior longitudinal stabilization ribs that extend along the container length between the first and second container ends for supporting the container when the outer sleeve is fully removed and the container is placed bottom side down on a flat surface with the retention tabs in the release positions.

9. The container assembly of claim 8, wherein the covers are pivotally moveable between open and closed positions, wherein cover latches are provided for latching the covers in the closed positions, and wherein tops of the covers define finger recesses including finger grips for facilitating manually opening the covers.

10. The container assembly of claim 8, wherein the lateral end flanges define an oval profile of the container, wherein the container defines a reduced profile defined by a longitudinal region that extends between the lateral end flanges, wherein the reduced profile has a first portion at the bottom side of the container that is inwardly inset with respect to the oval profile defined by the lateral end flanges, and wherein the exterior longitudinal stabilization ribs project laterally outwardly from the first portion of the reduced profile.

11. The container assembly of claim 10, wherein the reduced profile has a second portion at the top side of the container that aligns with the oval profile defined by the lateral end flanges of the container, the second portion being defined by the covers.

12. The container assembly of claim 1, wherein the container is a pill storage container, and wherein only seven of the storage compartments are defined by the container, and wherein when the outer sleeve is in the installed state over the container with the retention tabs secured in the retention positions the storage compartments adjacent the first sleeve end can be accessed by moving the retention tab at the second container end to the release position and pushing the container through the outer sleeve in an axial direction toward the first sleeve end to expose the storage compartments adjacent the first sleeve end, and wherein when the outer sleeve is in the installed state over the container with the retention tabs secured in the retention positions the storage compartments adjacent the second sleeve end can be accessed by moving the retention tab at the first container end to the release position and pushing the container through the outer sleeve in an axial direction toward the second sleeve end to expose the storage compartments adjacent the second sleeve end.

13. The container assembly of claim 1, wherein the container includes a base and a cover assembly, wherein the base includes a main base body that extends along the container length between the first and second container ends, wherein the main base body defines an inner storage volume, wherein the base includes divider walls unitary with the main base body that divide the inner storage volume into separate regions corresponding to the row of storage compartments, wherein the base includes lateral flanges at the first and second container ends that are unitary with the main base body, wherein the main base body defines a longitudinal cover mounting slot adjacent a first longitudinal side of the main base body and cover latch catches adjacent an opposite second longitudinal side of the main base body, wherein the covers are part of the cover assembly including an elongate attachment member and living hinges that couple the covers to the elongate attachment member, wherein the elongate attachment member is secured in the longitudinal cover mounting slot to pivotally attach the covers of the cover assembly to the base, and wherein the covers include cover latches adapted to engage the cover latch catches of the main base body to secure the covers in closed positions with respect to the base.

14. The container assembly of claim 13, wherein the container has a top side and a bottom side, wherein the covers are located at a top side of the container, wherein the base defines the bottom side of the container, wherein the lateral flanges each include a first and second flange segments that each extend from the top side to the bottom side of the container.

15. The container assembly of claim 14, wherein the lateral flanges define container end profiles, wherein when the retention tabs are in the retention positions, the main tab bodies are inside a boundary defined by each container end profile and the tab extensions project through first spaces between first ends of the first and second flange segments to locations outside the boundary defined by each container end profile.

16. The container assembly of claim 15, wherein the retention tabs are pivotally connected to the first and second container ends by living hinges located at second spaces defined between second ends of the first and second flange segments, and wherein the latching arrangements secure the retention tabs in the retention positions.

17. The container assembly of claim 16, wherein the outer sleeve defines an outer sleeve profile, and wherein when the outer sleeve is in the installed state and the retention tabs are secured in the retention positions the tab extensions extend laterally outwardly through notches in the outer sleeve to locations beyond the outer sleeve profile to provide finger access that facilitates manually unlatching the latching arrangements.

18. The container assembly of claim 17, wherein the container end profiles are oval, wherein the outer sleeve profile is oval, wherein the container end profiles define major and minor axes, and wherein the living hinges are positioned on opposite sides of the major axes from the latching arrangements.

19. The container assembly of claim 1, wherein when the outer sleeve is in the installed state over the container with the retention tabs secured in the retention positions the storage compartments adjacent the first sleeve end can be accessed by moving the retention tab at the second container end to the release position and pushing the container through the outer sleeve in an axial direction toward the first sleeve end to expose the storage compartments adjacent the first sleeve end, and wherein when the outer sleeve is in the installed state over the container with the retention tabs secured in the retention positions the storage compartments adjacent the second sleeve end can be accessed by moving the retention tab at the first container end to the release position and pushing the container through the outer sleeve in an axial direction toward the second sleeve end to expose the storage compartments adjacent the second sleeve end, wherein the covers are pivotally moveable between open and closed positions while the container remains within the outer sleeve, and wherein cover latches are provided for latching the covers in the closed positions.

20. The container assembly of claim 1, wherein the outer sleeve has a metallic construction, and the container has a molded plastic construction.

* * * * *